United States Patent
Lee et al.

(10) Patent No.: US 9,433,024 B2
(45) Date of Patent: Aug. 30, 2016

(54) COMMUNICATION METHOD OF TERMINAL AND COMMUNICATION METHOD OF BASE STATION FOR DIRECT COMMUNICATION LINK BETWEEN TERMINALS

(71) Applicant: Electronics and Telecommunications Research Institute, Daejeon (KR)

(72) Inventors: Anseok Lee, Daejeon (KR); Eunkyung Kim, Daejeon (KR); Wooram Shin, Daejeon (KR); Jae Sun Cha, Daejeon (KR); Kwang Jae Lim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 75 days.

(21) Appl. No.: 13/944,390

(22) Filed: Jul. 17, 2013

(65) Prior Publication Data

US 2014/0024384 A1 Jan. 23, 2014

(30) Foreign Application Priority Data

Jul. 18, 2012 (KR) ........................ 10-2012-0078419
Nov. 6, 2012 (KR) ........................ 10-2012-0125044
Jul. 17, 2013 (KR) ........................ 10-2013-0084023

(51) Int. Cl.
 *H04W 76/02* (2009.01)
(52) U.S. Cl.
 CPC .................. *H04W 76/023* (2013.01)
(58) Field of Classification Search
 CPC ... H04W 72/02; H04W 16/10; H04W 24/10; H04W 92/18; H04W 36/24–36/385; H04W 76/023; H04W 76/025; H04W 76/043; H04W 88/04; H04W 88/06; H04W 84/18; H04W 74/002–74/06
 USPC .............. 370/329–332; 455/418–420, 422.1, 455/425, 434, 435.2, 437, 450, 455, 456.1; 709/228
 See application file for complete search history.

(56) References Cited

U.S. PATENT DOCUMENTS

| | | | | |
|---|---|---|---|---|
| 2006/0252369 | A1* | 11/2006 | Rasanen | H04W 88/06 455/39 |
| 2007/0032255 | A1* | 2/2007 | Koo | H04W 56/002 455/512 |
| 2009/0073916 | A1* | 3/2009 | Zhang | H04B 7/15542 370/315 |
| 2010/0009675 | A1* | 1/2010 | Wijting | H04W 72/02 455/426.1 |

(Continued)

FOREIGN PATENT DOCUMENTS

| | | |
|---|---|---|
| KR | 10-2012-0074255 A | 7/2012 |
| WO | WO 2012/091418 A2 | 7/2012 |

*Primary Examiner* — George Eng
*Assistant Examiner* — Umair Ahsan
(74) *Attorney, Agent, or Firm* — Rabin & Berdo, P.C.

(57) ABSTRACT

A communication method of a terminal and a communication method of a base station for a direct communication link between terminals are disclosed. A base station schedules a reference terminal to transmit a ranging code, and schedules target terminals to receive the ranging code. The reference terminal measures the ranging code received from the target terminals, and transmits a ranging code measurement result to the base station. The base station selects a terminal from among the target terminals to form the direct communication link with the reference terminal among the target terminals based on the ranging code measurement result.

15 Claims, 6 Drawing Sheets

(56) References Cited

U.S. PATENT DOCUMENTS

| | | | | |
|---|---|---|---|---|
| 2011/0136484 A1* | 6/2011 | Braun | ............... | H04W 24/10 455/422.1 |
| 2012/0120892 A1* | 5/2012 | Freda et al. | ............... | 370/329 |
| 2012/0287800 A1* | 11/2012 | Siomina et al. | ............... | 370/252 |
| 2013/0003597 A1* | 1/2013 | Fukumasa | ............ | H04W 24/10 370/252 |
| 2013/0150051 A1* | 6/2013 | Van Phan | ............ | H04W 12/04 455/437 |
| 2013/0170398 A1* | 7/2013 | Kwon | ............... | H04W 8/005 370/255 |
| 2013/0322388 A1* | 12/2013 | Ahn | ............... | H04W 76/023 370/329 |
| 2013/0322413 A1* | 12/2013 | Pelletier | ............ | H04W 72/1289 370/336 |

* cited by examiner

COMMUNICATION METHOD OF TERMINAL AND COMMUNICATION METHOD OF BASE STATION FOR DIRECT COMMUNICATION LINK BETWEEN TERMINALS

CROSS-REFERENCE TO RELATED APPLICATION

This application claims priority to and the benefit of Korean Patent Application No. 10-2012-0078419, 10-2012-0125044 and 10-2013-0084023 filed in the Korean Intellectual Property Office on Jul. 18, 2012, Nov. 6, 2012, and Jul. 17, 2013, respectively, the entire contents of which are incorporated herein by reference.

BACKGROUND OF THE INVENTION (a) Field of the Invention

The present invention relates to a communication method of a terminal and a communication method of a base station for setting up and utilizing a direct communication link between terminals.

(b) Description of the Related Art

In a mobile communication system, in order to support a proximity-based service, a method of forming a direct communication link to perform communications between terminals is suggested. In particular, in IEEE 802.16n, IEEE 802.16.1a, and 3GPPP Direct Communication, a direct communication link between terminals is discussed.

When two terminals exist in a coverage area of a base station and an area where the two terminals may communicate with each other, a direct communication link is formed between the terminals so that data may be exchanged between the terminals. Under a frame structure of an infra communication (i.e., a cellular communication) between a base station and terminals, parts of resources for the cellular communication are used by terminals that utilize a direct communication link between terminals. Partial resources of an uplink in an infra communication (cellular communication) frame are allocated as radio communication resources for a direct communication link between terminals and the base station, and the terminals that participate in the infra communication do not use the resources allocated to the direct communication link between terminals. In the resources allocated as described above, the terminals perform the direct communication link between terminals by direct communication link protocols and processes.

In conventional methods, methods of performing communications using a direct link between terminals are described. However, development of a method of searching adjacent terminals to determine whether the direct communication link may be formed between terminals is insufficient.

SUMMARY OF THE INVENTION

An object of the present invention is to provide a method of searching adjacent terminals in order to set up a direct communication link between terminals.

Another object of the present invention is to provide a method of, when a direct communication link exists between terminals, continuously monitoring quality of the corresponding direct communication link.

Still another object of the present invention is to provide a method of, when a terminal that forms a direct communication link between terminals deviates from an area of a base station, sensing deviation of the terminal.

According to an exemplary embodiment of the present invention, a communication method of a base station for controlling a direct communication link between terminals is provided. The communication method may include selecting a first terminal as a reference terminal to form the direct communication link, selecting a second terminal as candidate terminals to form the direct communication link with the first terminal, scheduling the first terminal so that the first terminal transmits a first ranging code, scheduling the second terminal so that the second terminal receive the first ranging code, receiving first information measured using the first ranging code received by the second terminal from the first terminal, from the second terminal, and selecting a third terminal from among the second terminal to form the direct communication link with the first terminal using the first information.

The communication method may further include scheduling the first terminal so that the first terminal periodically transmits a second ranging code, and scheduling the third terminal so that the third terminal periodically receives the second ranging code.

The communication method may further include receiving a second information measured using the second ranging code periodically received by the third terminal from the first terminal, from the third terminal, and determining a existence of the direct communication link or a quality of the direct communication link using the second information.

The periodic communication method may further include determining that the first terminal is in a coverage lost state when the second ranging code is not received from the first terminal, and determining that the third terminal is in a coverage lost state when the second information is not received from the third terminal.

Scheduling the first terminal may include transmitting a ranging command message to the first terminal, and the ranging command message may include a field for transmission information of the first ranging code.

Scheduling the second terminal may include transmitting a ranging command message to the second terminal, and the ranging command message may include a field for reception information of the first ranging code.

Scheduling the first terminal to periodically transmit the second ranging code may include transmitting a ranging command message to the first terminal, and the ranging command message may include a field that represents a transmission period of the second ranging code and a transmission duration period of the second ranging code.

Scheduling the third terminal may include transmitting a ranging command message to the third terminal, and the ranging command message may include a field that represents a reception period of the second ranging code and a field that represents a reception duration period of the second ranging code.

Receiving the first information from the second terminal may include receiving a ranging response message from the second terminal, and the ranging response message may include a field that represents the first information.

According to another exemplary embodiment of the present invention, a communication method of a terminal that is a reference for forming a direct communication link between terminals is provided. The communication method may include being scheduled by a base station to transmit a first ranging code, transmitting the first ranging code to target terminals that are candidates to form the direct communication link with the terminal, and forming the direct communication link with a selected terminal selected from among the target terminals based on a measurement result of the first ranging code measured by the target terminals.

The communication method may further include being scheduled by the base station to periodically transmit a second ranging code, and periodically transmitting the second ranging code to the selected terminal.

When the base station does not receive the second ranging code, it may be determined that the terminal is in a coverage lost state.

Being scheduled by the base station may include receiving a ranging command message from the base station, and the ranging command message may include a field in which transmission information of the first ranging code is set up.

Being scheduled by the base station to transmit the second ranging code may include receiving a ranging command message from the base station, and the ranging command message may include a field that represents a transmission period of the second ranging code and a field that represents a transmission duration period of the second ranging code.

According to another exemplary embodiment of the present invention, there is provided a communication method of a base station for controlling a direct communication link between terminals. The communication method may include selecting a first terminal that is a reference for forming the direct communication link, selecting a second terminals that are candidates to form the direct communication link with the first terminal, transmitting a first ranging command message to the second terminals so that the second terminals transmit a first ranging code, transmitting a second ranging command message to the first terminal so that the first terminal receives the first ranging code, receiving first information measured using the first ranging code received by the first terminal from the second terminals, from the first terminal, and selecting a third terminal from among the second terminals to form the direct communication link with the first terminal using the first information.

The communication method may further include transmitting a third ranging command message to the first terminal so that the first terminal periodically receives a second ranging code, and transmitting a fourth ranging command message to the third terminal so that the third terminal periodically transmits the second ranging code.

The communication method may further include receiving second information measured using the second ranging code periodically received by the first terminal from the third terminal, from the first terminal, and determining a existence of the direct communication link or a quality of the direct communication link using the second information.

The first ranging command message may include a field in which transmission information of the first ranging code is set up. The second ranging command message may include a field in which reception information of the first ranging code is set up. The third ranging command message may include a field that represents a reception period of the second ranging code and a field that represents a reception duration period of the second ranging code. The fourth ranging command message may include a field that represents a transmission period of the second ranging code and a field that represents a transmission duration period of the second ranging code.

The communication method may further include determining that the first terminal is in a coverage lost state when the second information is not received from the first terminal, and determining that the third terminal is in a coverage lost state when the second ranging code is not received from the third terminal.

According to the exemplary embodiment of the present invention, the base station may search the terminals that may form the direct communication link between terminals so that a proximity-based service may be provided through the direct communication link.

According to the exemplary embodiment of the present invention, the base station may periodically obtain quality information of the direct communication link between terminals, and when the terminals that form the direct communication link deviate from the area of the base station, the deviation of the terminals may be rapidly recognized. Since the base station may rapidly recognize loss of the direct communication link and coverage loss, recovering processes of the direct communication link or service recovering processes may be rapidly performed.

DETAILED DESCRIPTION OF THE EMBODIMENTS

Figure 1:
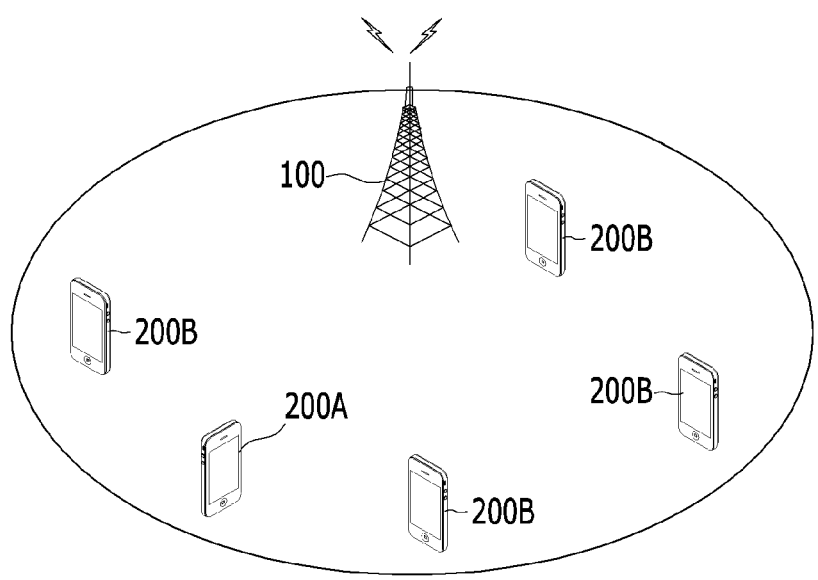
FIG. 1 is a view illustrating a mobile communication system for a direct communication link between terminals according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the entire specification, a terminal may refer to a mobile terminal (MT), a mobile station (MS), an advanced mobile station (AMS), a high reliability mobile station (HR-MS), a subscriber station (SS), a portable subscriber station (PSS), an access terminal (AT), and user equipment (UE) and may include entire or partial functions of the MT, the AMS, the HR-MS, the SS, the PSS, the AT, and the UE.

In addition, a base station (BS) may refer to an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) that functions as a BS, and a high reliability relay station (HR-RS) that may function as a BS, and may include entire or partial functions of the ABS, the node B, the eNodeB, the AP, the RAS, the BTS, the MMR-BS, the RS, and the HR-RS.

Hereinafter, a communication method of a terminal and a communication method of a base station for a direct communication link between terminals according to an exemplary embodiment of the present invention will be described in detail with reference to the drawings.

A communication method of a terminal and a communication method of a base station for setting up a direct communication link between terminals according to an exemplary embodiment of the present invention is divided into a process of searching a terminal to form a direct communication link between terminals, a process of selecting a terminal to form a direct communication link between terminals, a process of monitoring quality of a direct communication link between terminals, and a process of searching coverage loss of a terminal that forms a direct communication link. The respective processes will be described hereinafter.

First, referring to FIGS. 1 and 2, the process of searching a terminal to form a direct communication link between terminals according to an exemplary embodiment of the present invention will be described.

FIG. 1 is a view illustrating a mobile communication system for a direct communication link between terminals according to an exemplary embodiment of the present invention.

As illustrated in FIG. 1, a mobile communication system according to the exemplary embodiment of the present invention includes a base station 100 and terminals 200A and 200B in a coverage area of the base station 100. In FIG. 1, 200A denotes a terminal (hereinafter referred to as a reference terminal) that is a reference for a direct communication link between terminals, and 200B denotes terminals (hereinafter referred to as target terminals) that are candidates to form a direct communication link with the reference terminal 200A. Here, it is assumed that the reference terminal 200A is predetermined by communications between the reference terminal 200A and the base station 100.

In order to search the reference terminal 200A and the target terminals 200B, the base station 100 may perform scheduling so that the reference terminal 200A transmits a ranging code in a specific resource and the target terminals 200B receive a ranging code in a corresponding resource. At this time, the target terminals 200B that receive the ranging code may all be terminals in a cell, and the base station 100 may arbitrarily select terminals adjacent to the reference terminal 200A as the target terminals 200B. When base station 100 schedules transmission and reception of the ranging code in this way, since the same resource may be designated to all the target terminals 200B, the scheduling may be used by a broadcast. Therefore, the searching process may be performed by a small number of times of message transmission.

Figure 2:
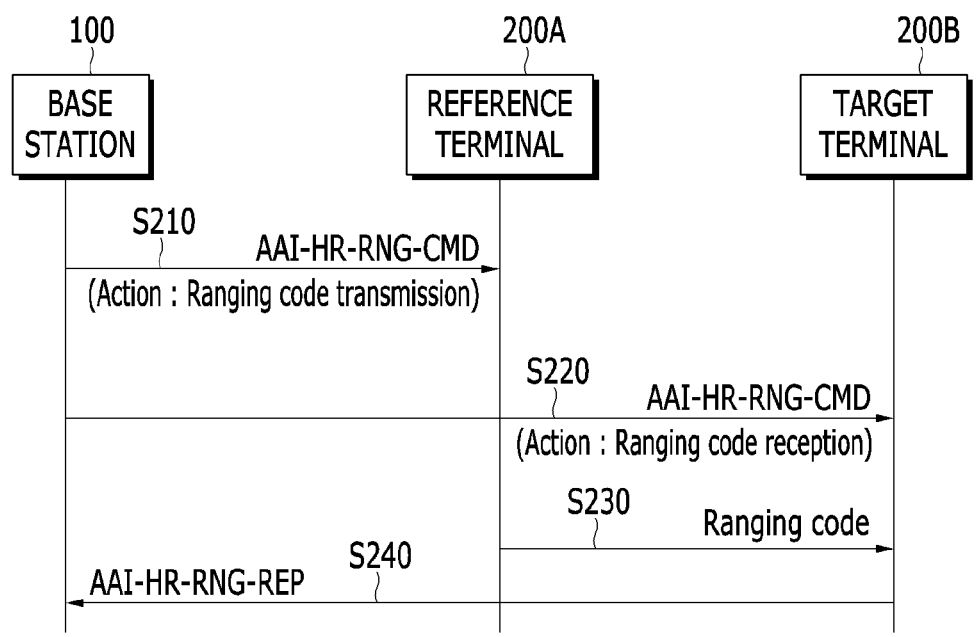
FIG. 2 is a view illustrating processes of searching a terminal to form a direct communication link between terminals according to an exemplary embodiment of the present invention.

FIG. 2 is a view illustrating a process of searching a terminal to form a direct communication link between terminals according to an exemplary embodiment of the present invention.

When the base station 100 schedules transmission of a ranging code of the reference terminal 200A and reception of a ranging code of the target terminals 200B, a ranging command message, Advanced Air Interface-High Reliability-Ranging-Command (AAI-HR-RNG-CMD) is used, and may be replaced by another message in accordance with a purpose.

First, the base station 100 transmits the ranging command message AAI-HR-RNG-CMD to the reference terminal 200A (S210) so that the reference terminal 200A is scheduled to transmit the ranging code. The ranging command message AAI-HR-RNG-CMD includes an Action field, a Frame field, an Index field, a Subframe Index field, and a Dedicated Ranging Code Index field. Here, the Action field is used for scheduling transmission or reception of the ranging code. Therefore, the Action field of the ranging command message AAI-HR-RNG-CMD transmitted to the reference terminal 200A is set up as Ranging code transmission so that the reference terminal 200A is scheduled to transmit the ranging code. The Frame field and the Subframe field are used for representing a position of a resource for transmitting the ranging code and the Dedicated Ranging Code Index is used for designating the ranging code to be transmitted by the reference terminal 200A.

The base station 100 transmits the ranging command message AAI-HR-RNG-CMD to the target terminals 200B (S220) so that the target terminals 200B are scheduled to receive the ranging code. That is, reception of the ranging code of the target terminals 200B is also scheduled by the ranging command message AAI-HR-RNG-CMD. The ranging command message AAI-HR-RNG-CMD transmitted to the target terminals 200B may include an Action field, a Frame Index field, and a Subframe Index field. The Action field of the ranging command message AAI-HR-RNG-CMD is set up as Ranging code reception so that the target terminals 200B are scheduled to receive the ranging code.

The ranging command message AAI-HR-RNG-CMD received by the target terminals 200B may include a Dedicated Ranging Code Index field as occasion demands. In the case where the Dedicated Ranging Code Index field is included in the ranging command message AAI-HR-RNG-CMD, the target terminals 200B inform the base station 100 of a ranging code measurement result only when the informed designate code is received. When the Dedicated Ranging Code Index field is not included in the ranging command message AAI-HR-RNG-CMD, the target terminals 200B inform the base station 100 of measurement results of all the received ranging codes.

As described above, when the reference terminal 200A is scheduled to transmit the ranging code and the target terminals 200B are scheduled to receive the ranging code by the ranging command message AAI-HR-RNG-CMD, the reference terminal 200A transmits the ranging code to the target terminals 200B (S230).

The target terminals 200B inform the base station 100 of a received result (i.e., a ranging code measurement result) through a ranging response message, Advanced Air Interface-High Reliability-Ranging-Reply (AAI-HR-RNG-REP) when the ranging code transmitted by the reference terminal 200A is received (S240). The ranging response message AAI-HR-RNG-REP used for informing a ranging code reception result includes a Frame Index field, a Subframe Index field, a Dedicated Ranging Code Index field, a signal to interference plus noise ratio (SINR) field, a Time Offset field, and a Frequency Offset field. Here, the Frame Index field and the Subframe Index field represent a position of a resource that receives the ranging code and the Dedicated Ranging Code Index field is used for identifying the received ranging code. The SINR field, the Time Offset field, and the Frequency Offset field are used for representing a measurement result of a received ranging code.

By the processes described in FIG. 2, the base station 100 schedules transmission or reception of the ranging code and the target terminals 200B inform the base station 100 of the ranging code measurement result. Therefore, the base station 100 may obtain information on the target terminals 200B that may form a link with the reference terminal 200A.

Figure 3:
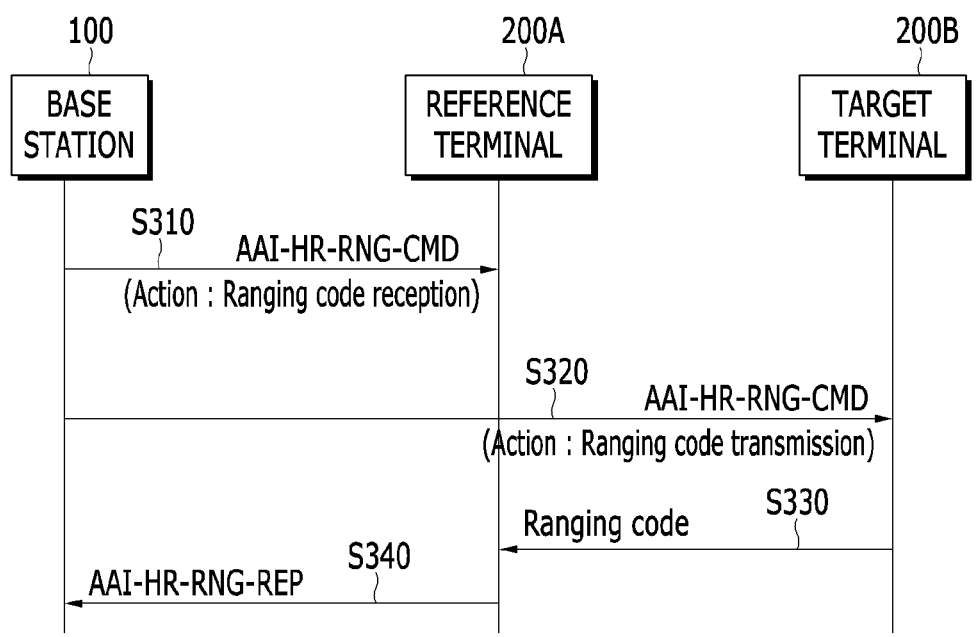
FIG. 3 is a view illustrating processes of searching a terminal to form a direct communication link between terminals according to another exemplary embodiment of the present invention.

FIG. 3 is a view illustrating processes of searching a terminal to form a direct communication link between terminals according to another exemplary embodiment of the present invention.

Unlike in the exemplary embodiment of FIG. 2, the base station 100 may schedule the reference terminal 200A to receive a ranging code through at least one resource, and may schedule the target terminals 200B to transmit a ranging code using different resources or different code indices.

As illustrated in FIG. 3, the base station 100 transmits the ranging command message AAI-HR-RNG-CMD to the reference terminal 200A, and the Action field of the ranging command message AAI-HR-RNG-CMD is set up as Ranging code reception (S310).

The base station 100 transmits the ranging command message AAI-HR-RNG-CMD to the target terminals 200B and the Action field of the ranging command message AAI-HR-RNG-CMD is set up as Ranging code transmission (S320). At this time, when the plurality of target terminals 200B exist, different resources or different code indices are allocated to the target terminals 200B, respectively. Therefore, the base station 100 may transmit the ranging command message AAI-HR-RNG-CMD to the target terminals 200B, respectively.

By the processes S310 and S320, the reference terminal 200A is scheduled to receive the ranging code and the target terminals 200B are scheduled to transmit the ranging code.

Then, the target terminals 200B transmits the ranging code to the reference terminal 200A using the different resources or the different code indices (S330).

The reference terminal 200A measures the ranging code received from the target terminals 200B and transmits the measurement result to the base station 100 through the ranging response message AAI-HR-RNG-REP (S340). As described above, according to an exemplary embodiment of the present invention, although the reference terminal 200A receives the ranging code from each of the target terminals 200B, the reference terminal 200A may transmit the measurement result to the base station 100 through the ranging response message AAI-HR-RNG-REP at one time.

As illustrated in FIG. 2 or 3, after the base station 100 receives the ranging measurement result, the base station 100 performs a process of selecting a terminal to form a direct communication link between terminals. The base station 100 selects a target terminal to form a direct communication link with the reference terminal 200A among the target terminals 200B, and the selected target terminal is referred to as a selected terminal 200B'.

Figure 4:
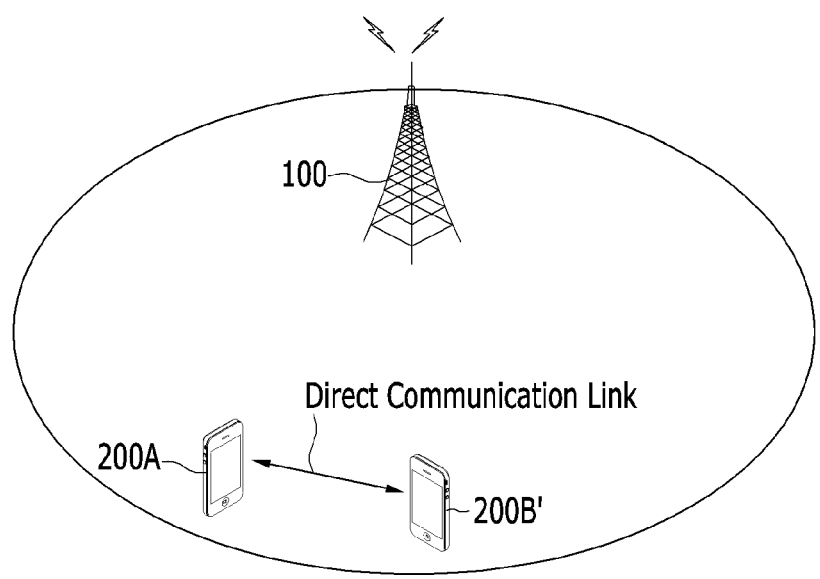
FIG. 4 is a view illustrating a case in which a direct communication link is used for providing a proximity-based service.

FIG. 4 is a view illustrating a case in which a direct communication link is used for providing a proximity-based service.

The base station 100 may divide services that may be provided through a direct communication link with the reference terminal 200A using the received ranging measurement result. The base station 100 may select the selected terminal 200B' among the target terminals 200B so that the reference terminal 200A may provide a specific service such as a social network service to adjacent terminals using the direct communication link.

There are various methods of the base station 100 to select the service to be provided using the direct communication link among the services of the reference terminal 200A. First, a method of using the direct communication link between terminals for all the services may be applied.

Second, a method of using the direct communication link when radio resources may be saved may be applied.

Figure 5:
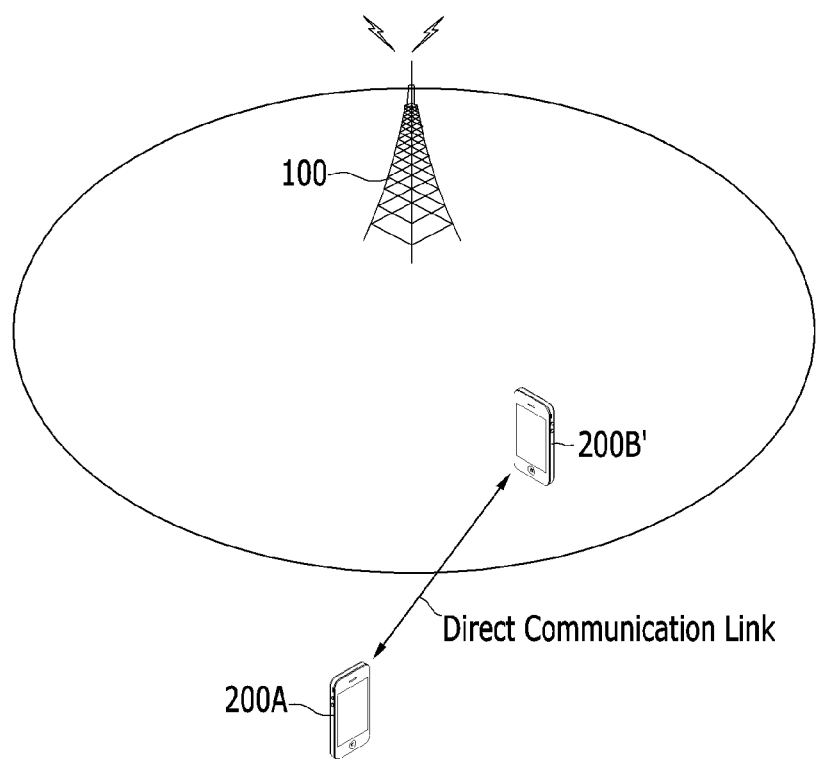
FIG. 5 is a view illustrating a case in which a direct communication link is used for recovering loss of a reference terminal 200A.

On the other hand, when the reference terminal 200A is lost from the base station 100 as illustrated in FIG. 5, as well as when a proximity-based service is provided through the direct communication link, the direct communication link may be used for recovering the reference terminal 200A.

FIG. 5 is a view illustrating a case in which a direct communication link is used for recovering the reference terminal 200A.

The base station 100 may select the selected terminal 200B' to replace the reference terminal 200A among the target terminals 200B adjacent to the reference terminal 200A, and the selected terminal 200B' may perform a function of relaying data of the reference terminal 200A.

Various references may be applied to the method of the base station 100 to select the selected terminal 200B' to form a replacement channel of the reference terminal 200A. For example, a method of selecting the terminal having the best link quality with the reference terminal 200A as the selected terminal 200B' may be applied. A method of selecting the terminal having the best link quality with the base station 100 as the selected terminal 200B' may be applied. In addition, a method of selecting the terminal having good link quality with both the reference terminal 200A and the base station 100 as the selected terminal 200B' may be applied.

After the base station 100 selects the selected terminal 200B' to form the direct communication link with the reference terminal 200A, the base station 100 performs a process of monitoring quality of the direct communication link. That is, the base station 100 may periodically monitor link quality between the reference terminal 200A and the selected terminal 200B'. Hereinafter, the above will be described in detail.

Figure 6:
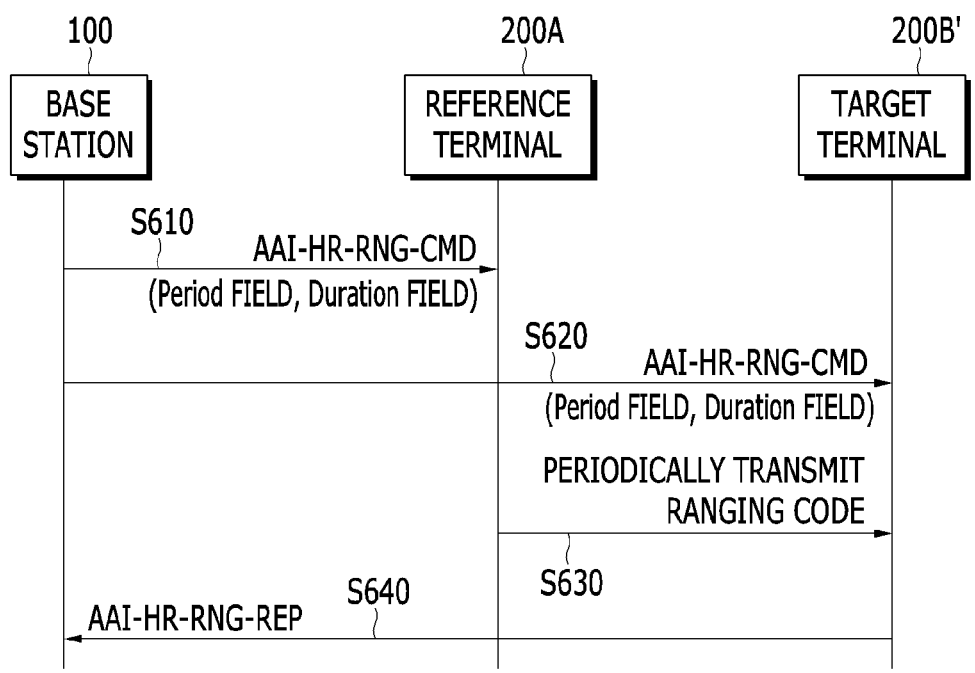
FIG. 6 is a view illustrating processes of monitoring quality of a direct communication link between terminals according to an exemplary embodiment of the present invention.

FIG. 6 is a view illustrating processes of monitoring quality of a direct communication link between terminals according to an exemplary embodiment of the present invention.

The base station 100 schedules the reference terminal 200A to periodically transmit a ranging code, and schedules the selected terminal 200B' to periodically receive a ranging code in order to monitor a direct communication link between the reference terminal 200A and the selected terminal 200B'.

Periodic transmission of the ranging code of the reference terminal 200A and periodic reception of the ranging code of the selected terminal 200B' are scheduled through the ranging command message AAI-HR-RNG-CMD described in FIG. 2.

As shown in FIG. 6, the base station 100 transmits the ranging command message AAI-HR-RNG-CMD to the reference terminal 200A (S610), and transmits the ranging command message AAI-HR-RNG-CMD to the selected terminal 200B' (S620). An Action field is set up as Ranging code transmission in the ranging command message AAI-HR-RNG-CMD transmitted to the reference terminal 200A, and an Action field is set up as Ranging code reception in the ranging command message AAI-HR-RNG-CMD transmitted to the selected terminal 200B'. A Period field and a Duration field are additionally set up in the ranging command message AAI-HR-RNG-CMD.

A period of transmission or reception of the ranging code may be set up through the Period field of the ranging command message AAI-HR-RNG-CMD. The base station sets up a value of the Period field of the ranging command message AAI-HR-RNG-CMD as a value that is not 0 (i.e., a fixed period). The reference terminal 200A that receives the ranging command message AAI-HR-RNG-CMD having the fixed period periodically transmits the ranging code from an initial transmission point of the ranging code (S630). The selected terminal 200B' that receives the ranging command message AAI-HR-RNG-CMD having the fixed period periodically receives the ranging code from an initial reception point of the ranging code.

On the other hand, a duration time of transmission or reception of the ranging code may be set up through the Duration field of the ranging command message AAI-HR-RNG-CMD. When the Duration field is not 0, the reference terminal 200A transmits the ranging code for a time obtained by multiplying a predetermined period by the Duration field and stops transmitting the ranging code. Then, the selected terminal 200B' receives the ranging code for the time obtained by multiplying the predetermined period by the Duration field and stops receiving the ranging code. On the other hand, when the reference terminal 200A receives a command for stopping periodic transmission of the ranging code from the base station 100, transmission of the ranging code is stopped, and when the selected terminal 200B' receives a command for stopping periodic transmission of the ranging code from the base station 100, transmission of the ranging code is stopped.

The selected terminal 200B' measures the ranging code received from the reference terminal 200A and informs the base station 100 of the measurement result through the ranging response message AAI-HR-RNG-REP (640). The base station 100 may determine whether the direct communication link is lost and quality of the direct communication link through the ranging code measurement result received from the selected terminal 200B'. When the base station 100 recognizes the loss of the direct communication link, the base station 100 may start to inform the reference terminal 200A and the selected terminal 200B' of the loss of the link, or may start a process of recovering the loss of the direct communication link.

On the other hand, contrary to the case illustrated in FIG. 6, the base station 100 may schedule monitoring of the direct communication link. That is, like in the case of FIG. 3, the base station 100 may schedule the reference terminal 200A to periodically receive the ranging code and may schedule the selected terminal 200B' to periodically transmit the ranging code. In this case, the selected terminal 200B' transmits the ranging code to the reference terminal 200A, and the reference terminal 200A informs the base station 100 of the ranging code measurement result through the ranging response message AAI-HR-RNG-REP.

The base station 100 refers to a case in which one of two terminals (i.e., the reference terminal and the selected terminal) that form a direct communication link or to forming a direct communication link that deviates from a transmission area of the base station 100 as coverage loss. Hereinafter, a method of detecting the coverage loss will be described.

As illustrated in FIG. 6, when the reference terminal 200A periodically transmits the ranging code, the base station 100 may receive the ranging code transmitted by the reference terminal 200A. When the base station does not receive the ranging code, the base station may determine that the reference terminal 200A is in a coverage lost state.

In addition, as illustrated in FIG. 6, the selected terminal 200B' periodically transmits the ranging code measurement result to the base station 100. Therefore, the base station 100 may determine that the selected terminal 200B' is in a coverage lost state when the ranging response message AAI-HR-RNG-REP is not received.

On the other hand, as described above, the base station 100 may schedule the reference terminal 200A to periodically receive the ranging code and may schedule the selected terminal 200B' to periodically transmit the ranging code. In this case, the base station 100 may determine that the selected terminal 200B' is in a coverage lost state when the ranging code transmitted by the selected terminal 200B' is not received. The base station 100 may determine that the reference terminal 200A is in a coverage lost state when the ranging response message AAI-HR-RNG-REP transmitted by the reference terminal 200A is not received.

The following Table 1 is a view illustrating a description of the respective fields of the above-described ranging command message, the message field description AAI-HR-RNG-CMD.

TABLE 1

| Field | Size (bits) | Value/Description | Condition |
|---|---|---|---|
| Frame Identifier | 4 | Frame which contains the ranging channel. The frame identifier is the 4 least significant bits of the frame number. | |
| Subframe Index | 3 | Indicates the subframe index of the allocated ranging opportunity. | |
| Action | 2 | Indicates the purpose of this message 0b00: Ranging code transmission 0b01: Ranging code reception 0b10: Terminate periodic ranging code transmission or reception 0b11: Reserved | |
| if (Action == 0b00){ | | | |
| Period | 4 | Indicates the period of periodic ranging: Bits 0-3: If bit 0-3 represent the binary representation of the integer N, then the Period = $2^N + 1$ [Superframes] | Shall be present when this message is unicast |
| Duration | 8 | Indicates the duration of periodic ranging 0: Stop the periodic ranging code transmission when it receive the suspension command 1-255: Stop the periodic ranging code transmission after this value of periods | Shall be present when this message is unicast |

TABLE 1-continued

| Field | Size (bits) | Value/Description | Condition |
|---|---|---|---|
| Dedicated ranging code index | 5 | Indicates the index of dedicated ranging code. | |
| Transmit power level | 5 | Unsigned integer from 0 to 31 in units of 1 dBm, where 0b00000 = 0dBm and 0b11111 = 31dBm | |
| Reversed action offset | 4 | Indicates the reversed action<br>0: No reversed action<br>1-15: Number of frames between the transmit and reception frames | |
| If (Reversed action offset != 0) { | | | |
| Reporting mode | 1 | Indicates if the report mode is exclusive or triggered by threshold.<br>0b0: exclusive reporting<br>0b1: triggered-based reporting | |
| if(Reporting mode == 0b1){ | | | |
| SINR threshold | 4 | Indicates the SINR threshold for the ranging signal above which report should be made by receiving station. The 4 bit value from 0b0000 to 0b1111 represent values among {−9, −8.5, −8, −7.5, −7, −6.5, −6, −5.5, −5, −4.5, −4, −3.5, −3, −2.5, −2, −1.5} dB | |
| } | | // end of Reporting mode | |
| } | | // end of Reversed action offset | |
| } | | // end of Action | |
| } elseif (Action = 0b01) { | | | |
| Period | 4 | Indicates the period of periodic ranging:<br>Bits 0-3: If bit 0-3 represent the binary representation of the integer N, then the Period = 2^N + 1 [Superframes] | Shall be present when this message is unicast |
| Duration | 8 | Indicates the duration of periodic ranging<br>0: Stop the periodic ranging code transmission when it receive the suspension command<br>1-255: Stop the periodic ranging code transmission after this value of periods | Shall be present when this message is unicast |
| Reversed action offset | 4 | Indicates the reversed action<br>0: No reversed action<br>1-15: Number of frames between the transmit and reception frames | |
| Reporting mode | 1 | Indicates if the report mode is exclusive or triggered by threshold.<br>0b0: exclusive reporting<br>0b1: triggered-based reporting | |
| if(Reporting mode == 0b1){ | | | |
| SINR threshold | 4 | Indicates the SINR threshold for the ranging signal above which report should be made by receiving station. The 4 bit value from 0b0000 to 0b1111 represent values among {−9, −8.5, −8, −7.5, −7, −6.5, −6, −5.5, −5, −4.5, −4, −3.5, −3, −2.5, −2, −1.5} dB | |
| } | | // end of Reporting mode | |
| If (Reversed action offset != 0) { | | | |
| Dedicated ranging code index | 5 | Indicates the index of dedicated ranging code. | |
| Transmit power level | 5 | Unsigned integer from 0 to 31 in units of 1 dBm, where 0b00000 = 0dBm and 0b11111 = 31dBm | |

TABLE 1-continued

| Field | Size (bits) | Value/Description | Condition |
|---|---|---|---|
| } else {<br>Dedicated ranging code index<br>}<br>} | 5 | Indicates the index of dedicated ranging code.<br>// end of Reversed action offset | Optional |

The following Table 2 is a view illustrating description of the respective fields of the above-described ranging response message, message field description AAI-HR-RNG-REP.

TABLE 2

| Field | Size (bits) | Value/Description | Condition |
|---|---|---|---|
| For (i = 0; i < Number of ranging codes to be reported; i++){ | | | |
| Frame Identifier | 4 | Frame which contains the ranging channel. The frame identifier is the 4 least significant bits of the frame number. | |
| Subframe Index | 3 | Indicates the subframe index of the allocated ranging opportunity. | |
| Received ranging code index | 5 | Indicates the index of dedicated ranging code received in this ranging opportunity | |
| Received SINR | 4 | Indicates the received SINR of the ranging code. The 4 bit value from 0b0000 to 0b1111 represent values among {−9, −8.5, −8, −7.5, −7, −6.5, −6, −5.5, −5, −4.5, −4, −3.5, −3, −2.5, −12, −1.5} dB | |
| Timing offset | 15 | Time offset, in units of $F_s$, of the received ranging signal, with respect to the frame timing of the HR-MS.<br>MSB 1 bit represents the sign of the value. That is, the value is negative (−) if the MSB = 0b1 and the value is positive (+) if the MSB = 0b0. LSB 14 bits represent timing offset correction value of [1 . . . 16384] that corresponds to 0x0000-0x3FFF, respectively. | Optional |
| Frequency offset | 9 | Frequency offset, in units of 2% of the subcarrier spacing (f), of the received ranging signal, with respect to the frequency of the HR-MS.<br>MSB 1 bit represents the sign of the value. That is, the value is negative (−) if the MSB = 0b1 and the value is positive (+) if the MSB = 0b0. LSB 8 bits represent frequency offset correction value of [1 . . . 256] that corresponds to 0x00-0xFF, respectively. | Optional |
| } | | | |

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A communication method of a base station for controlling a direct communication link between terminals, comprising:

scheduling a first terminal by sending, from the base station, a first ranging command message to the first terminal using unicast transmission, so that the first terminal transmits a first ranging code;

scheduling second terminals by sending, from the base station, a second ranging command message to the second terminals using broadcast transmission, so that the second terminals receive the first ranging code transmitted by the first terminal; and receiving first information from the second terminals, the first information including a quality measurement result of the first ranging code that is received by the second terminals from the first terminal, wherein the first and second ranging command messages are of a same format that includes a plurality of fields, including
an action field indicating whether each ranging command message is for ranging code transmission or ranging code reception, the action field in the first ranging command message indicating the ranging code transmission, the action field in the second ranging command message indicating the ranging code reception, and
a dedicated ranging code index that is an index identifying the first ranging code.

2. The communication method of claim 1, further comprising:
scheduling the first terminal so that the first terminal periodically transmits a second ranging code; and
scheduling a third terminal so that the third terminal periodically receives the second ranging code, wherein the third terminal is another terminal that is selected from among the second terminals and that forms the direct communication link with the first terminal.

3. The communication method of claim 2, further comprising:
receiving second information from the third terminal, the second information including a quality measurement result of the second ranging code that is periodically received by the third terminal from the first terminal; and
determining an existence of the direct communication link or a quality of the direct communication link using the second information.

4. The communication method of claim 3, further comprising:
determining that the first terminal is in a coverage lost state when the second ranging code is not received from the first terminal.

5. The communication method of claim 2, wherein the scheduling the first terminal to periodically transmit the second ranging code comprises transmitting a third ranging command message to the first terminal,
wherein the third ranging command message includes information representing a transmission period of the second ranging code and a transmission duration period of the second ranging code.

6. The communication method of claim 2, wherein the scheduling the third terminal comprises transmitting a fourth ranging command message to the third terminal,
wherein the fourth ranging command message includes information representing a reception period of the second ranging code and a reception duration period of the second ranging code.

7. The communication method of claim 1, wherein the receiving the first information from the second terminals comprises receiving a ranging response message including the first information from the second terminals.

8. A communication method of a terminal that is a reference terminal for forming a direct communication link between terminals, comprising:
receiving a first ranging command message sent by a base station via unicast transmission for transmitting a first ranging code;
transmitting the first ranging code to a target terminal that is an candidate for forming the direct communication link with the terminal, the target terminal receiving a second ranging command message sent by the base station via broadcast transmission for receiving the first ranging code transmitted by the first terminal; and
forming the direct communication link with the target terminal based on a quality measurement result of the first ranging code measured by the target terminal,
wherein the first and second ranging command messages are of a same format that includes a plurality of fields, including
an action field indicating whether each ranging command message is for ranging code transmission or ranging code reception, the action field in the first ranging command message indicating the ranging code transmission, the action field in the second ranging command message indicating the ranging code reception, and
a dedicated ranging code index that is an index identifying the first ranging code.

9. The communication method of claim 8, further comprising:
receiving a second ranging command message from the base station for periodically transmitting a second ranging code; and
periodically transmitting the second ranging code to the target terminal.

10. The communication method of claim 9, wherein, when the base station does not receive the second ranging code, it is determined that the terminal is in a coverage lost state.

11. The communication method of claim 8, wherein the first ranging command message comprises a field indicating the transmission of the first ranging code.

12. The communication method of claim 9,
wherein the second ranging command message comprises a field that represents a transmission period of the second ranging code and a field that represents a transmission duration period of the second ranging code.

13. The communication method of claim 1, wherein the quality measurement result includes at least one of a signal-to-interference-plus-noise ratio (SINR), a time offset and a frequency offset.

14. The communication method of claim 4, further comprising:
determining that the third terminal is in a coverage lost state the second information is not received from the third terminal.

15. The communication method of claim 1, further comprising:
receiving a ranging response message from the second terminals, which send the ranging response message in response to the second ranging command message, and upon receiving the first ranging code sent by the first terminal, wherein
the ranging response message includes
the first information, and
a dedicated ranging code index that is an index identifying the received first ranging code.

* * * * *